United States Patent

[11] 3,551,672

[72] Inventors John C. Homer, III
 Willoughby;
 John R. Stock, Fairview Park, Ohio
[21] Appl. No. 649,528
[22] Filed June 28, 1967
[45] Patented Dec. 29, 1970
[73] Assignee Stock Equipment Company
 Cleveland, Ohio
 a corporation of Ohio

[54] METHOD AND APPARATUS FOR MEASURING RATES OF RANDOM PULSES AND ALARM ACTUATED THEREBY
 20 Claims, 5 Drawing Figs.
[52] U.S. Cl................................................. 250/43.5, 250/83.6
[51] Int. Cl................................................. G01n 23/12
[50] Field of Search.......................................... 250/43.5DR, 83.6, 83.6W

[56] References Cited
 UNITED STATES PATENTS
3,100,395 8/1963 Morley......................... 250/43.5D
3,221,166 11/1965 Allenden....................... 250/83.6X
3,327,631 6/1967 Howard et al. ................ 250/43.5D Primary Examiner—Archie R. Borchelt
Attorney—Bosworth, Sessions, Herrstrom and Knowles ABSTRACT: Apparatus for discriminating between rates of pulses that occur randomly in time, such as pulses derived from emissions by radioactive materials, and an alarm, such as an alarm for indicating a reduction in the flow of material through a conduit, controlled by the circuit. The apparatus discriminates between different rates of occurrence of pulses by comparing the interval between successive pulses to a predetermined but variable interval and providing electrical pulses "down pulses" corresponding to radiation pulses occurring at intervals greater than the predetermined interval and electrical pulses "up pulses" occurring at intervals less than predetermined interval. These up pulses and down pulses may be utilized, for example, to give an indication of a rate of radioactive emission or to actuate an alarm or control.

PATENTED DEC 29 1970
3,551,672
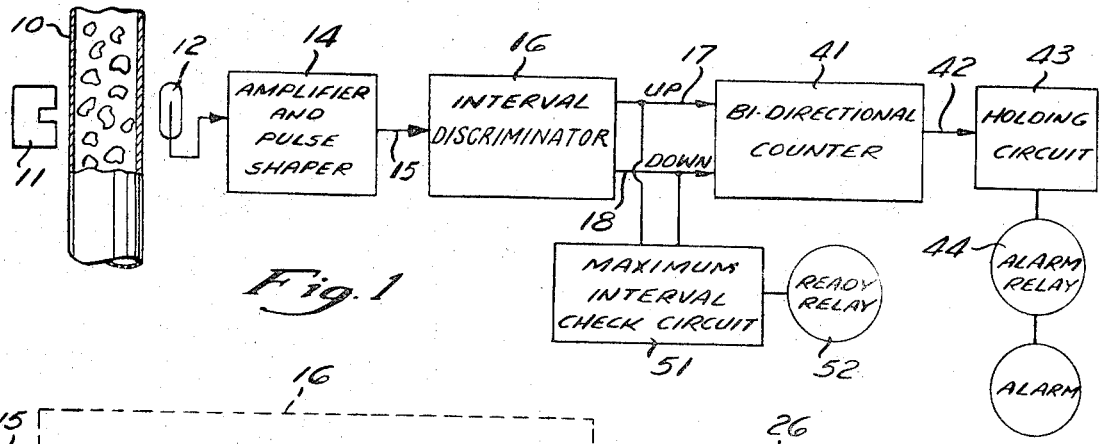
Fig. 1
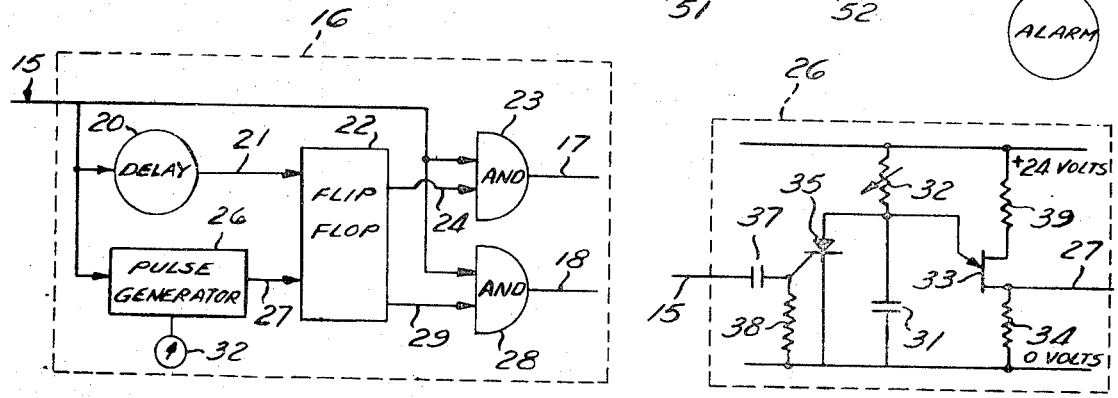
Fig. 2
Fig. 3
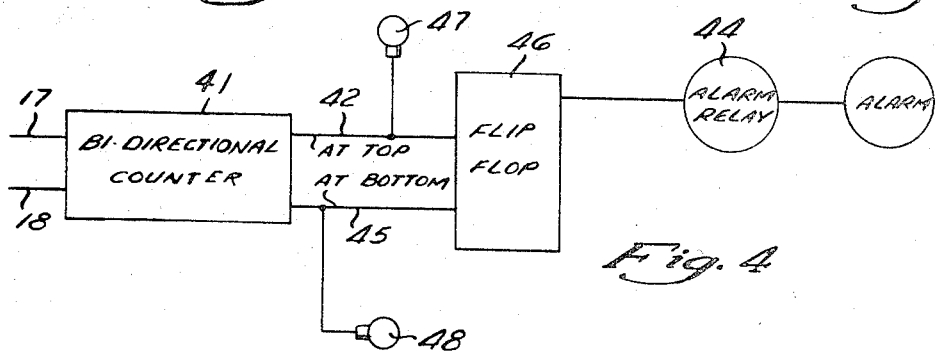
Fig. 4
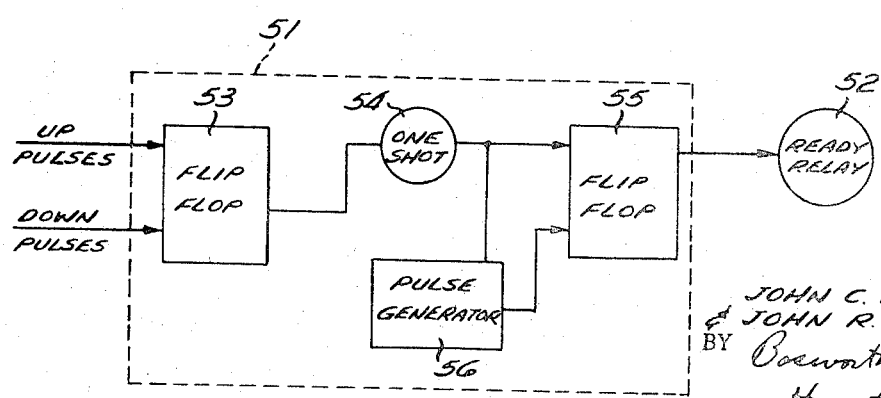
Fig. 5
INVENTORS
JOHN C. HOMER, III
& JOHN R. STOCK
BY Bosworth, Sessions,
Herstrom & Knowles
ATTORNEYS

METHOD AND APPARATUS FOR MEASURING RATES OF RANDOM PULSES AND ALARM ACTUATED THEREBY

FIELD OF THE INVENTION

This invention relates to a method and apparatus for discriminating between rates of pulses that occur randomly in time, such as pulses derived from emissions by radioactive materials, and also to an alarm or control system that responds to differences in rates of pulses. Also, the invention relates to an apparatus for measuring the amount of material in a conduit, such as the presence or absence of coal in a conduit through which the coal flows, and the actuation of an alarm or a control if the amount of material in the conduit goes below a predetermined minimum.

DESCRIPTION OF THE PRIOR Art

Devices for measuring the level of nuclear radiation are well known, and various measuring and gauging devices utilizing such radiation are known. For example, the Stock U.S. Pat. No. 3,291,981, issued Dec. 13, 1966, illustrates an apparatus that includes a source of radiation and a detector unit placed on opposite sides of a conduit through which coal flows on its way to a furnace. The amount of radiation reaching the detector is roughly proportional to the mass of material between the radiation source and the detector. When less than a predetermined amount of coal is in the conduit between the radiation source and the detector, the amount of radiation received by the detector will increase above a predetermined value. When this occurs, circuits associated with the detector actuate an alarm to warn personnel or activate controls to prevent damage to the system. Similar systems are utilized to measure or control the level of liquids in tanks, the flow of other materials in conduits, the thickness of moving webs or sheets of rubber, steel or other materials, and for various other applications. These systems require that the electrical circuits associated with the detector discriminate between different rates of radiation received by the detector, and, in general, it is desirable that the source of radiation be as small as possible to minimize hazards to health, that the response of the system be prompt, that the system be highly reliable, that the chances of false alarms be minimized and that the system have a fail safe characteristic.

In these devices, the source of radiation can be conventional such as radium 226, cobalt 60 or cesium 137, and the detector usually is a Geiger tube, the signal from the tube being amplified so that the signal can operate a relay for controlling the external device. The emission of particles by the radioactive source is random in time, and the output pulses of the Geiger tube are also random in time. Heretofore, because of the random nature of the emission of the pulses, it has been the practice to measure the intensity of the radiation impinging upon a Geiger tube by, in effect, counting the pulses that are emitted by the tube over a period of time. When weak sources are employed, the counting period must be relatively long if accurate results are desired. The counting period can be reduced if the strength of the source is increased, but increasing the strength of the source is undesirable. Increasing the period of time during which the count is made makes the response of the unit slow.

Prior circuits have usually involved systems in which pulses derived from the output of a Geiger tube are impressed across an RC circuit, developing a voltage across the capacitor which decays over a period of time whose length depends upon the time constant of the circuit. Circuits of this type are relatively slow in response.

It has also been proposed to improve the usual RC circuit by discharging the capacitor at a constant rate that is independent of the rate at which pulses are fed to the capacitor and to detect when the voltage on the capacitor has changed by a predetermined amount from an initial voltage. See U.S. Pat. No. 3,056,047. This, however, does not lessen the fundamental difficulty in determining average rates of pulses, which arises from their random nature. For example, it can be shown mathematically that if the average number of output pulses of a Geiger tube is 25 per second, there is only about one chance in 13 of actually measuring 25 pulses in any particular second. There is an equal chance of measuring 24 pulses in any given second, and there are slightly lesser chances for other nearby numbers, such as 23 and 26. There are definite, although small chances for detecting any other numbers, such as 10 and 41. Thus, an attempt to measure the true average intensity of detected radiation by counting pulses for a 1 second interval is unlikely to give a measurement which is exactly equal to the true value, but is likely to give a measurement that is close to the true value. There is also a definite chance that the measurement will differ widely from the true value. It is because of the fact that the number of random pulses that take place in a reasonably short time interval, such as 1 second, may depart substantially from the longer term average, that devices of this type may give false alarms due, for example, to a momentary rapid burst of pulses, or fail to give an alarm within the required time because of a momentary reduction in the instantaneous pulse rate.

SUMMARY OF THE INVENTION

The general objects of the invention are the provision of an improved method and apparatus for discriminating between different rates of radiation in which quicker and more reliable response can be obtained than is possible with prior systems embodying radiation sources of similar intensity; the provision of an improved alarm for indicating a departure of a level of radiation from a predetermined value; the provision of an improved alarm for indicating a reduction in the flow of material such as coal through a conduit; the provision of an alarm system having improved fail-safe characteristics and the provision of an alarm system embodying a circuit to indicate whether or not the alarm is operative.

According to the present invention, these and other objects and advantages of the invention are attained not by, in effect, merely averaging the number of pulses that occur in a predetermined length of time, but by utilizing the time interval between a pulse and the immediately preceding pulse to obtain additional information concerning the pulse rate. The time interval between pulses is measured by comparing the interval between successive pulses to a predetermined but variable or adjustable interval. An electrical pulse, hereinafter referred to as a down pulse, is provided to correspond to each radiation pulse occurring at an interval greater than the predetermined interval, and an electrical pulse, hereinafter referred to as an up pulse, is provided for each pulse occurring at an interval less than the predetermined interval. These up pulses and down pulses are then constantly counted and balanced against each other, and a predominance of one type of pulse over the other is utilized to give an alarm or an indication of radiation level, or to effect a control.

It is evident that an alarm signal should not be given in response to say, a few up pulses or a few down pulses because the random nature of the pulses would result in too many false indications. According to the present invention, this difficulty is overcome by feeding the up pulses and the down pulses into a bidirectional counter which may be either a digital or an analogue device. The up pulses cause the counter to count up, and the down pulses cause it to count down. The counter has a fixed number of positions, in the present example about 50. This means that the lowest possible count is zero, and the highest possible count is 50. A continued series of up pulses causes the counter to remain in the top position, and a continued series of down pulses causes the counter to remain in the down position. The counter may float between the top and bottom positions if the up and down pulses are approximately balanced. If no pulses come in at all, then the counter stays wherever it last was. This system is advantageous because a series of up pulses presents a high radiation rate for which an alarm is to be given, and if the up pulses in the series come close together, then the counter counts up to the top position very rapidly. As explained below, this may be used to give an alarm, but since up pulses are not likely to occur in sufficient number to give an alarm unless the radiation level is above that desired, the likelihood of false alarm is low.

BRIEF DESCRIPTION OF THE DRAWINGS

In the drawings:

FIG. 1 diagrammatically illustrates apparatus embodying the invention particularly as applied to a coal flow alarm;

FIG. 2 is a block diagram showing the interval discriminator;

FIG. 3 is a schematic diagram of the variable rate pulse generator;

FIG. 4 is a block diagram illustrating an alternate form of a portion of the apparatus shown in FIG. 1;

FIG. 5 is a block diagram showing the maximum interval check circuit and the ready relay.

DESCRIPTION OF THE PREFERRED EMBODIMENTS

The invention is disclosed herein as applied to a coal flow alarm that gives an indication and, if desired, actuates controls if there is a substantial reduction in the amount of coal in a conduit through which coal is flowing downwardly. As shown in the drawing, the alarm is associated with a conduit 10 that is normally full of coal moving downwardly ultimately to be supplied to a furnace. An appropriately shielded radiation source 11 is disposed on one side of the conduit. On the other side of the conduit, there is a radiation detector such as a Geiger tube 12. In a typical construction when the conduit 10 is full of coal, the output of the Geiger tube is at the average rate of about 15 pulses per second with a source 11 consisting of 2 millicuries of radium 226 and with a conduit having a diameter of 24 inches. Under the same conditions when the conduit is empty, the average rate is about 90 pulses per second. Background radiation from cosmic rays or traces of radioactive elements in the earth contribute about 0.3 pulses per second of these totals. Since the flow of coal may be reduced to a dangerously low rate without the conduit being completely empty because of coal hanging up on the walls of the conduit or for other reasons, it is desirable to have an alarm given at an average count of substantially less than 90 pulses per second. Also, because of variations in density of the coal, occasional voids, and the like, a higher average pulse rate than 15 may be considered normal. Therefore, in a practical apparatus, it is desirable to discriminate between a low average pulse rate of about 25 as indicating a satisfactory condition and a high average pulse rate of about 50 as indicating a condition in which an alarm should be given.

This is accomplished according to the present invention by the elements shown in the block diagram constituting the right hand portion of FIG. 1. The Geiger tube 12 is energized from a high voltage source in the conventional manner. The output of the Geiger tube is supplied to an amplifier and pulse shaper 14. This may be of a known type and amplifies the weak output pulse of the Geiger tube to a useful value and shapes the pulse to a generally rectangular shape having a duration of approximately 50 microseconds. The shaped and amplified pulse is supplied through line 15 to the interval discriminator 16. In the interval discriminator 16, each pulse is classified as either an up pulse or a down pulse by comparing the time interval between successive pulses to a predetermined time interval, which can be varied to change the response of the apparatus. As will appear below, the circuit is such that a pulse that follows the immediately preceding pulse in a period of time less than the predetermined interval results in the transmission of an up pulse through line 17, while a pulse that follows the immediately preceding pulse by a period of time greater than the predetermined interval results in the transmission of a down pulse through line 18. Thus, any pulse on line 15 also appears on either line 17 or line 18, but not on both.

A preferred arrangement of the interval discriminator 16 is shown in FIG. 2. As there indicated, the output pulse of the amplifier and pulse shaper 14 is fed through a brief time delay 20, which may delay the pulse for about 50 microseconds, to the set input 21 of a flip-flop 22. When the flip-flop 22 is in the set condition, its output renders permissive the "AND" gate 23 through line 24. Pulses on incoming line 15 are also fed to variable rate pulse generator 26 and, as described below, have the effect of inhibiting and resetting the variable rate pulse generator 26. When not so inhibited and reset, the variable rate pulse generator 26 supplies a continuing sequence of pulses, separated by a preset but adjustable time interval, on the reset line 27 of flip-flop 22. When the flip-flop 22 is in the reset condition, its output renders permissive the AND gate 28 through line 29. However, when the variable rate pulse generator does receive an inhibiting and resetting pulse from line 15, it will not produce an output pulse for the preset time interval.

Thus, a pulse on line 15 will pass through either AND gate 23 or AND gate 28 depending upon the state of flip-flop 22. Specifically, the pulse will be transmitted through AND gate 23 and become an up pulse whenever it follows the immediately preceding pulse on line 15 by a time less than the interval between pulses generated by the variable rate pulse generator, for flip-flop 22 will have been set by the preceding pulse. On the other hand, the pulse will be transmitted through AND gate 28 and becomes a down pulse whenever it follows the preceding pulse on line 15 by a time sufficiently great that the variable rate pulse generator 26 has reset flip-flop 22. Time delay 20 has the function of preventing an incoming pulse on line 15 from setting flip-flop 22 until after that pulse has been classified as an up pulse or down pulse depending upon the state of flip-flop 22 as determined by the preceding pulse.

Referring to FIG. 3, the operation of the variable rate pulse generator 26 is as follows:

Capacitor 31 is continuously charged through variable resistor 32 from the power supply. When the voltage on capacitor 31 reaches a particular value, unijunction transistor 33 starts to conduct, which discharges capacitor 31 through resistor 34. This results in the appearance of an output pulse on flip-flop reset line 27. Capacitor 31 immediately begins to recharge and the cycle is repeated, resulting in a continuing succession of pulses on reset line 27 separated by a predetermined period of time. The period of time between pulses can be varied by adjusting resistor 32. Incoming pulses on line 15, which are of positive polarity, are brought to the gate of SCR 35 and cause SCR 35 to conduct. SCR 35 continues to conduct until capacitor 31 is completely discharged, at which time SCR 35 reverts to its nonconducting state. It is necessary that the minimum value of resistor 32 be sufficiently large that it alone cannot hold SCR 35 in the conducting state. Thus, a pulse on line 15 has the effect of inhibiting the next pulse that would have gone out on reset line 27, and the pulse on line 15 further restarts the timing cycle of capacitor 31 and resistor 32. If no further pulse comes on line 15, then a pulse is generated on line 27 after the full preset time period has elapsed. Capacitor 37 is a coupling capacitor; resistor 38 establishes gate bias for SCR 35, and resistor 39 serves to limit peak current through unijunction transistor 33. In the example given, the preferred uninhibited pulse rate of generator 26 is 27 per second.

The output of signals through lines 17 and 18 is delivered to a bidirectional counter 41 which can be either an analogue or a digital device. Up pulses cause the counter to count up and down pulses cause the counter to count down. In a preferred example, the bidirectional counter has a lower limit of zero and an upper limit of about 50. In other words, when the counter is in its lowest state (zero), down pulses have no further effect, and when the counter is in its top state (50), up pulses have no effect. In its analogue form, the bidirectional counter may comprise, for example, a capacitor, the voltage of which is clamped at a higher and a lower value by diodes, the up pulses and down pulses being the turning on of positive and negative constant current generators for the time duration of the pulses, charging or discharging the capacitor by discrete amounts.

In FIG. 1, when the bidirectional counter is at its upper limit, an output signal is transmitted through line 42 to a holding circuit 43 and then to alarm relay 44. It will be noted that with this system, if the conduit 10 is completely empty instead of merely partially so, then the pulses from the Geiger tube will be at a very high rate with a large majority of these being up pulses. The bidirectional counter will count up very rapidly, giving the alarm particularly quickly.

The holding circuit 43 is a two-state device which is set by a signal on line 42 and is reset by loss of signal on line 42 lasting, in the preferred example, for at least 2 seconds. The holding circuit 43 may consist of a flip-flop in conjunction with a pulse generator having an inhibit and reset input similar to the variable rate pulse generator 26 and flip-flop 22 previously described. This method of controlling the alarm relay 44 from the bidirectional counter 41 has the advantage that, when coal flow is reestablished in conduit 10 and the majority of pulses on line 15 becomes down pulses on line 18, the bidirectional counter is not required to count down all the way from its uppermost state to its lowermost state to deactivate the alarm relay. The maximum time delay in deactivating the alarm relay, in the preferred example, is 2 seconds, whereas it might be much longer if pulses from Geiger tube 12 are at a very low rate and the counter is required to count all the way down.

In the modified form shown in FIG. 4, the counter must go to its lower limit before the alarm is turned off. As before, when the bidirectional counter is at its upper limit, an output signal is transmitted through line 42. When the bidirectional counter reaches its lower limit, an output signal is transmitted through line 45. These two lines effect a set and reset, respectively, of a flip-flop 46. Thus, this flip-flop is set if the bidirectional counter is at the top or is in the middle of range, that is, in count positions 1 through 49 after having been previously at the top, and is in its reset state if bidirectional counter 41 is at its lower limit or if it is in the middle range after having previously been at the lower limit. When flip-flop 46 is in its set state, then it activates the output alarm relay 44, causing an alarm or control condition to be effected. Alarm relay 44 is deactivated whenever the bidirectional counter 41 reaches its lowermost state, thereby resetting flip-flop 46.

A signal light or other indicator 47 may also be connected to the line 42 so that a visual indication will be given when the bidirectional counter is at its upper limit. Similarly, a signal light 48 or other indicator may be connected to the line 45 to give an indication when the counter is at its lower limit. The purpose of such indication will be described below.

A modification in the operation of the apparatus can be made by changing the effect of the up pulses and down pulses in bidirectional counter 41. For example, each up pulse can move the bidirectional counter up one step while each down pulse can move the bidirectional counter down two or more steps. This gives a quicker response to reductions in level of radiation.

CALIBRATION

The operation can be checked and the device calibrated by use of the apparatus shown in the aforesaid Stock U.S. Pat. No. 3,291,981. This is accomplished by alternately interposing two blocks of metal between the radiation source 11 and the Geiger tube 12, instead of the conduit 10. One block of metal would have radiation absorption characteristics such that the average level of radiation reaching the Geiger tube will correspond to the level to be expected when the apparatus is operating normally; in the case of a coal alarm, this is with the conduit 10 nearly full of coal. In the example given, this block would permit an average of 25 pulses per second to be picked up by the Geiger tube. The second block of metal would have radiation absorption characteristics corresponding to the level of radiation reaching the detector that corresponds to the level of radiation that would occur in service when the alarm should be given. In the case of a coal alarm, this would be with the conduit nearly empty of coal, or, in the example given, an average of 50 pulses per second. As these two blocks of metal are alternately interposed between the radiation source 11 and Geiger tube 12, the alarm should be seen turning on and shutting off. If this is not the case, the predetermined time of the variable rate pulse generator 26 can be changed as required.

An alternate means of calibration is to provide a single block of metal having radiation absorption characteristics such that the random pulses picked up by the Geiger tube give an equal fraction, namely one-half of up pulses and down pulses. Under these conditions, the bidirectional counter will have no preference for the top or bottom limit, and the alarm will be on or off approximately 50 percent of the time.

It may be preferable to employ three blocks of metal which can in turn be interposed between the radiation source and the Geiger tube. The first has a radiation absorption coefficient corresponding to the 50 percent up pulse and 50 percent down pulse situation. The other two correspond to the conduit nearly full of coal, or average rates of 50 pulses per second and 25 pulses per second. The unit is then calibrated using the first block. The second and third blocks are used to check its performance and be certain that the alarm actually does turn off and does turn on under the corresponding conditions.

USE OF APPARATUS AS A METER

The apparatus can be used as a meter not only to discriminate between two levels of radiation, but also to measure the actual average rate of radiation. This can be accomplished by the use of indicating lights 47 and 48 on output lines 42 and 45 of the bidirectional counter 41. The meter is first calibrated by placing the Geiger tube 12 in a field of known radiation intensity or by the use of metal blocks having known radiation absorption characteristics. For each known radiation field or known metal block, the control knob of resistor 32 in FIGS. 2 and 3 is adjusted until lights 47 and 48 have equal chance of flashing on. The known radiation intensity is then marked upon the knob of resistor 32. Where the device is subject to unknown radiation, the operator observes lights 47 and 48 to determine whether the bidirectional counter is at the top or bottom of its range, or in an intermediate position. The bidirectional counter is at its top level; the operator turns the adjusting knob of resistor 32 to reduce the interval between pulses generated by the variable rate pulse generator until indicating lights 47 and 48 come on equally frequently. The calibrated setting of control 32 would then give a measurement of the value of the radiation level.

When the device is used as a meter, its characteristics automatically make possible the rapid reading of strong radiation fields because the time response of the apparatus is rapid in strong fields because both up pulses and down pulses are occurring frequently. With fields of lower intensity, the time response is slower, but the accuracy is maintained. This is a useful characteristic of the meter since it avoids the necessity of changing the time constant of the device more or less in accordance with the expected field to be measured, as has heretofore been the case.

Another adjustment that can be made both when the device is used as a meter or an alarm is to vary the number of steps in the bidirectional counter. Decreasing the number of steps in the counter speeds up the time response of the system. Thus, it makes the alarm or meter more sensitive; however, it also has the effect of increasing the likelihood of false alarms.

FAIL-SAFE FEATURE

Electrical devices of the type that detect an on-off or out-of-limit condition and provide an indication thereof are generally constructed to be fail-safe, meaning that the less desirable or fail-safe condition is the one indicated in the event of failure of electrical power to the device. Specifically, if the output means of the device is a relay, a choice must be made as to whether the relay is deenergized when the out-of-limit condition is detected, the fail-safe alternative, or whether the relay is energized when the out-of-limit condition is detected. Either choice leads to problems because the former or fail-safe choice can allow nuisance false alarms during momentary power failures, whereas the latter choice means the device is inoperative during power failures which may result in a major catastrophe.

The problem is solved in the present invention by the provision of a second output relay in addition to the alarm relay 44, namely the ready relay 52 which may give, for example, a visual signal. Since the ready relay 52 is energized only when the system power is on, it can be used to indicate loss of power and hence that the entire apparatus is inoperative. It then becomes tolerable to drive alarm relay 44 from the holding circuit 43 in FIG. 1 so that the alarm or undesirable condition, no coal in the preferred example, causes alarm relay 44 to be energized. Loss of power to the entire apparatus need not permit a major catastrophe resulting from inoperation of the apparatus because the plant operator can tell from the indication from ready relay 51 that the apparatus is inoperative and take appropriate safety measures or effect any required control operations manually.

The incorporation of ready relay 52 into the apparatus can be made not only to avoid the problems associated with power loss to the apparatus, but also to avoid related problems that may occur when certain internal portions of the apparatus fail to operate properly. In broad terms, this is accomplished as shown in FIG. 1. The up pulses on line 17 and the down pulses on line 18 are brought into the maximum interval check circuit 51. It is the purpose of the maximum interval check circuit 51 to verify that the pulse rate detected by Geiger tube 12 is neither abnormally high nor abnormally low. In so doing, the operation of Geiger tube 12, amplifier and pulse shaper 14 and interval discriminator 16 is verified as being at least approximately correct. The detailed manner in which the maximum interval check circuit accomplishes this function is described below.

A preferred form of the maximum interval check circuit is shown in FIG. 5. The overall function of this circuit is to verify that there is at least one up pulse followed by one down pulse within a predetermined interval, in the specific example 5 seconds. Note that if the pulse rate from the Geiger tube were abnormally high, then down pulses would be rare, and the chance of having a down pulse in the 5 second interval becomes exceedingly small. Correspondingly, if the pulse rate from the Geiger tube is abnormally low or vanishes altogether, then no up pulses are to be expected in the 5 second interval.

Up pulses from line 17 and down pulses from line 18 are supplied to flip-flop 53. Up pulses set flip-flop 53 and down pulses reset it. Whenever the flip-flop 53 has been set and is reset by a down pulse, then one-shot 54 develops a single output pulse. This single pulse is developed only at the time of resetting, and no additional pulse comes until the flip-flop 53 has been set and then reset again. The pulse developed by one-shot 54 is supplied to the set input of flip-flop 55 and also to the inhibit and reset input of pulse generator 56. The pulse generator 56 may be of the same type as variable rate pulse generator 26 described above, but need not have a variable rate. When not inhibited and reset by a pulse from one-shot 54, pulse generator 56 supplies pulses at regular intervals to the reset input of flip-flop 55. In the specific example, this regular interval is 5 seconds. So long as flip-flop 55 remains in the set state, ready relay 52 is energized. Thus, ready relay 52 remains energized so long as pulses from one-shot 54 occur at intervals of less than 5 seconds, that is, when there is at least one up pulse followed by a down pulse within the 5 second interval.

It was mentioned above that when the ready relay 52 is incorporated into the overall apparatus, the alarm relay 44 is preferably connected to the circuit which drives it so that when an alarm condition exists, alarm relay 44 is energized. This fact alone assures that momentary loss of power to the apparatus will not cause nuisance alarms or control actions. Note that it was assumed that the external control actions are determined by contacts on alarm relay 44 only, independently of the ready relay 52. However, when the ready relay 52 is driven by a circuit such as the maximum interval check circuit 51, it may be preferable to interlock the alarm relay 44 and the ready relay 52 so that external control actions can take place or external alarms be given only if both the alarm relay and the ready relay are energized. Thus, failure of certain components which would otherwise cause a false alarm are overridden by the nonready status of the ready relay 52.

If calibration means as described in Stock U.S. Pat. No. 3,291,981 are provided for the apparatus of the present invention, it may be convenient to provide a limit switch on the mechanical portion of the calibrating means which is electrically connected to deenergize the ready relay 52 whenever the radiation source 11 and Geiger tube 12 are not in the normal operating positions on opposite sides of the conduit 10. Thus, although the alarm relay 44 may be repeatedly energized and deenergized as calibration is being performed, the external control functions or alarms remain unaffected. Remote indication of the nonready condition should be made.

It should be clear that the maximum interval check circuit 51 driving the ready relay 52 can be made to receive its input signals from nearly any portion of the basic interval discriminator-bidirectional counter circuit, thus becoming either more or less sophisticated and verifying the operation of other portions of the circuit to a greater or lesser degree.

SUMMARY

From the foregoing description, it will be evident that the invention provides a method and apparatus whereby the average rate of emission of random pulses can be determined with accuracy over relatively short periods of time and whereby different levels of radiation can be readily distinguished. This is accomplished by separating and classifying the pulses as to the time elapsed between the immediately preceding pulse and the pulse whose characteristic is being classified. The up pulses and down pulses so classified are then balanced against each other in a bidirectional counter having a limited counting range, and a preponderance of up pulses or down pulses are employed to give signals showing the intensity of the radiation falling upon the detector tube. In the preferred form of apparatus, the detection circuit is utilized to control an alarm to indicate the presence or absence of a solid material such as coal in the conduit and to give an alarm or operate controls when the radiation level increases beyond a predetermined amount indicating a reduction in the amount of the solid material present in the conduit.

The invention also comprises the provision of a fail-safe system that gives a separate signal indicating that the apparatus is in operative condition only when the power source to the apparatus is on and the detector circuit is working as shown by the presence of signals indicative of the receipt of pulses by the detector tube and the interval discriminator. Such a separate signal permits interlocking with the signal showing intensity of radiation so that nuisance false signals can be avoided.

Those skilled in the art will appreciate the various changes and modifications in the invention and various adaptations of the invention to different applications can be made without departing from the spirit and scope thereof. The essential characteristics are summarized in the claims.

We claim:
1. A method for determining average rates of occurrence of random pulses which includes the steps of comparing the time intervals between successive pulses with a predetermined time interval, classifying pulses that follow a preceding pulse by an interval greater than the predetermined time interval in one category, classifying pulses that follow a preceding pulse by an interval less than the predetermined time interval in another category, balancing the pulses in one of the categories against the pulses in the other and utilizing a preponderance of pulses in one of the categories over the other to provide an output signal.

2. A method according to claim 1 wherein the pulses in one category are balanced against the pulses in the other category by storing the number of pulses in one category less the number of pulses in the other category to provide a stored difference between the pulses in one category and the pulses in the other category, limiting both the maximum and the minimum values of the stored difference and providing an output signal when the maximum value is reached.

3. A method according to claim 1 wherein the pulses in one category are balanced against the pulses in the other category by storing the number of pulses in one category less the number of pulses in the other category to provide a stored difference between the pulses in one category and the pulses in the other category, limiting both the maximum and the minimum values of the stored difference and providing an output signal when the minimum value is reached.

4. A method according to claim 1 wherein the pulses in one category are balanced against the pulses in the other category by storing the number of pulses in one category less the number of pulses in the other category to provide a stored difference between the pulses in one category and the pulses in the other category, limiting both the maximum and the minimum values of the stored difference and providing an output signal whenever either the maximum or the minimum is reached.

5. A method for discriminating between rates of pulses derived from emissions by radioactive materials which includes the steps of detecting the pulses by a Geiger tube, amplifying the pulses so detected, comparing the time interval between each detected pulse and the pulse immediately preceding it with a predetermined but variable interval, providing in one path an electrical pulse corresponding to a detected pulse occurring at an interval greater than the predetermined interval, and providing in another path an electrical pulse corresponding to a detected pulse that follows a preceding pulse by an interval less than the predetermined time interval, storing said electrical pulses, the electrical pulses through one path increasing the number of pulses in the store and the electrical pulses through the other path decreasing the number of pulses in the store, providing maximum and minimum limits to the capacity of the store, and giving an output signal whenever the maximum limit of the store is reached.

6. A method according to claim 5 including the steps of activating an alarm in response to the output signal and turning off the alarm whenever the number of pulses in the store remains below the maximum for a predetermined period of time.

7. A method according to claim 5 including the steps of activating an alarm in response to the output signal and turning off the alarm whenever the minimum limit of the store is reached.

8. Apparatus for determining rates of occurrence of emissions of radioactive materials comprising a detector for detecting such emissions and providing output pulses derived from such emissions, means for amplifying the output pulses to provide electrical pulses that are spaced in time in accordance with the timing of the pulses detected by the detector, means for comparing the interval between successive pulses to a predetermined interval and for providing an electrical down pulse to correspond to each radiation pulse occurring at an interval greater than the predetermined interval, and an electrical up pulse for each pulse occurring at an interval less than the predetermined interval, a bidirectional counter having the capacity for storing a predetermined number of pulses between a minimum number and a maximum number, means for separately supplying said up and down pulses to said bidirectional counter to cause said counter to count up and down, respectively, said bidirectional counter providing an output signal whenever the number of pulses stored therein reaches the upper limit.

9. Apparatus according to claim 8 having an alarm activated by said output signal.

10. Apparatus according to claim 9 wherein means for turning off the alarm when the bidirectional counter reaches its minimum condition are provided.

11. Apparatus according to claim 9 having means for turning off the alarm when the stored difference remains less than the maximum value for a predetermined length of time.

12. Apparatus according to claim 8 having relay means for indicating that the apparatus is in ready condition, the relay means and circuits for controlling the relay means to give such indication only when the power supply to the apparatus is operative and when each up pulse is followed by a down pulse within a predetermined period of time.

13. Apparatus for measuring the amount of material in a conduit and indicating when the amount of material is below a predetermined amount, comprising a source of radiation directed at said material, means for detecting the radiation passing through said material and converting it to a series of electrical pulses, an interval discriminator for comparing the interval between the electrical pulses derived from the radiation pulses to a predetermined but variable interval, means for converting the electrical pulses into down pulses corresponding to intervals greater than and up pulses corresponding to intervals less than the predetermined interval, means for storing said up and down pulses so that up pulses increment said storage means and down pulses decrement said storage means, means defining upper and lower storage limits for said storage means, said storage means providing an output signal when it reaches its upper limit, alarm means indicating when said upper limit of said storage means has been detected, means for turning off said alarm means when the count in said storage means has fallen below its upper limit and remained below said upper limit for a predetermined amount of time.

14. The apparatus of claim 13 wherein said interval discriminator comprises a flip-flop, a variable rate pulse generator connected to the reset input of said flip-flop, said pulse generator having an inhibit input, a delay circuit connected to the set input of said flip-flop, the input to said delay circuit and the inhibit input to said variable rate pulse generator being connected together and to the source of electrical pulses, whereby each electrical pulse inhibit said variable rate pulse generator and sets said flip-flop which remains set until the interval between consecutive electrical radiation pulses is longer than the interval between pulses from the variable rate pulse generator, whereby a comparison is obtained of the interval between radiation pulses to the interval between pulses from the variable rate pulse generator.

15. The apparatus of claim 14 wherein the interval discriminator comprises two AND gates, each having as one of its inputs the source of electrical pulses derived from the radiation pulses, the first AND gate having as its remaining input the "set" output of the flip-flop, whereby the output of said first AND gate is an up pulse, the second AND gate having as its remaining input the "reset" output of the flip-flop, whereby the output of said second AND gate is a down pulse.

16. The apparatus of claim 13 wherein the means for storing the up and down pulses so that the up pulses increment said storage means and the down pulses decrement said storage means comprises a storage capacitor and two constant current generators whereby pulses defining intervals below the predetermined interval cause the first constant current generator to increment the charge on said storage capacitor by a determined amount and pulses defining intervals above the predetermined interval cause the second constant current generator to decrement the charge on said storage capacitor by a determined amount.

17. Apparatus according to claim 13 having a maximum interval check circuit connected to the output of said interval discriminator for determining that at least one up pulse followed by a down pulse occur within a predetermined time interval, means for determining that electrical power is present to the apparatus, and means indicating that the apparatus is in ready condition when both aforesaid conditions are satisfied.

18. A method of determining whether or not an apparatus as defined in claim 13 is operative, which comprises repetitively determining that at least one up pulse followed by a down pulse occur within each predetermined increment of time and giving an indication that the apparatus is in a state of operativeness only so long as there is at least one up pulse followed by a down pulse within each predetermined increment of time.

19. Apparatus for providing fail-safe operation of a detector device which measures a variable having a known possible range, said device having a first output that provides an indication when the variable goes beyond a preset limit within the known possible range and stops the indication when the variable returns within the preset limit, comprising a second output that is energized only when power is supplied to the detector device and the variable measures anywhere within the known range, and connections between the first output and the second output so that no indication is given unless both outputs are present.

20. A method for determining average rates of occurence of random pulses which includes the steps of comparing the time intervals between successive pulses with a predetermined time interval, producing a first signal when the interval between successive pulses is greater than the predetermined interval, producing a second signal instead of the first signal and distinct therefrom when the interval between successive pulses is less than the predetermined interval, balancing the first signals against the second signals and utilizing a preponderance of one signal over the other to provide an output signal.